(12) United States Patent
Huang et al.

(10) Patent No.: US 12,085,077 B2
(45) Date of Patent: Sep. 10, 2024

(54) SCROLL COMPRESSOR WITH A PRESSURE RELIEF LOW-SPEED ROTATION STRUCTURE

(71) Applicant: GUANGDONG MIDEA ENVIRONMENTAL TECHNOLOGIES CORPORATION LIMITED, Guangdong (CN)

(72) Inventors: Baiying Huang, Guangdong (CN); Osamu Aiba, Guangdong (CN); Hidenobu Shintaku, Guangdong (CN)

(73) Assignee: GUANGDONG MIDEA ENVIRONMENTAL TECHNOLOGIES CORPORATION, Guangdong (CN)

( * ) Notice: Subject to any disclaimer, the term of this patent is extended or adjusted under 35 U.S.C. 154(b) by 0 days.

(21) Appl. No.: 18/114,550

(22) Filed: Feb. 27, 2023

(65) Prior Publication Data
US 2023/0213033 A1  Jul. 6, 2023

Related U.S. Application Data

(63) Continuation of application No. PCT/CN2020/134989, filed on Dec. 9, 2020.

(30) Foreign Application Priority Data

Aug. 31, 2020  (CN) .......................... 202010900752.9
Aug. 31, 2020  (CN) .......................... 202021863999.X

(51) Int. Cl.
*F04C 18/02* (2006.01)
*F04B 53/10* (2006.01)
(Continued)

(52) U.S. Cl.
CPC ........ *F04C 18/0215* (2013.01); *F04B 53/102* (2013.01); *F04B 53/103* (2013.01);
(Continued)

(58) Field of Classification Search
CPC .............. F04C 18/0215; F04C 18/0253; F04C 28/24; F04C 28/26; F04C 29/12; F04C 29/124;
(Continued)

(56) References Cited

U.S. PATENT DOCUMENTS 6,027,321 A * 2/2000 Shim ...................... F04C 23/008
418/270
2004/0126246 A1 * 7/2004 Liang .................... F04C 27/005
417/310

FOREIGN PATENT DOCUMENTS

CN   101415947 A   4/2009
CN   104343693 A   2/2015
(Continued)

OTHER PUBLICATIONS

International Search Report dated Jun. 2, 2021 received in International Application No. PCT/CN2020/134989.
(Continued)

*Primary Examiner* — Mary Davis
(74) *Attorney, Agent, or Firm* — Scully, Scott, Murphy & Presser, P.C.

(57) ABSTRACT

A scroll compressor is provided. The scroll compressor has a housing, a partition plate, a rack, a movable scroll plate, a stationary scroll plate and a pressure relief low-speed rotation structure. The partition plate is in the interior of the housing and divides the interior of the housing into a suction space and a discharge space, and has a first through to communicate the suction space with the discharge space. The rack is in the suction space and spaced apart from the partition plate. The movable scroll plate is movably pro- (Continued)

vided on the rack. The stationary scroll plate is provided on the rack and cooperates with the movable scroll plate, and has a second through hole communicating with the discharge space. The pressure relief low-speed rotation structure is provided on the stationary scroll plate and configured to communicate the second through hole with the discharge space.

11 Claims, 4 Drawing Sheets

(51) Int. Cl.
    *F04C 28/24*     (2006.01)
    *F04C 28/26*     (2006.01)
    *F04C 29/12*     (2006.01)
    *F16K 11/10*     (2006.01)
    *F16K 15/00*     (2006.01)
    *F16K 15/02*     (2006.01)
    *F16K 15/14*     (2006.01)

(52) U.S. Cl.
    CPC .......... *F04C 18/0253* (2013.01); *F04C 28/24* (2013.01); *F04C 28/26* (2013.01); *F04C 29/12* (2013.01); *F04C 29/124* (2013.01); *F04C 29/126* (2013.01); *F16K 11/105* (2013.01); *F16K 15/00* (2013.01); *F16K 15/023* (2013.01); *F16K 15/1401* (2021.08); *F04C 2240/806* (2013.01)

(58) Field of Classification Search
    CPC .............. F04C 29/126; F04C 2240/806; F04B 53/102; F04B 53/103; F16K 11/105; F16K 15/00; F16K 15/023; F16K 15/1401
    See application file for complete search history.

(56) References Cited

FOREIGN PATENT DOCUMENTS

| | | |
|---|---|---|
| CN | 105952638 A | 9/2016 |
| CN | 208281168 U | 12/2018 |
| CN | 111878395 A | 11/2020 |
| KR | 19980042643 A | 8/1998 |
| KR | 20060104452 A | 10/2006 |
| KR | 100795957 B1 | 1/2008 |
| WO | 2015194000 A1 | 12/2015 |
| WO | WO-2017026744 A1 * 2/2017 .......... F04C 18/0215 |

OTHER PUBLICATIONS

Supplementary European Search Report dated Jan. 25, 2024 received in European Patent Application No. EP 20951231.8.
Request for the Submission of an Opinion dated Jun. 17, 2024 received in Korean Patent Application No. KR 10-2023-7005743.
Office Action dated Jun. 3, 2024 received in Canadian Patent Application No. CA 3, 188,503.

* cited by examiner

SCROLL COMPRESSOR WITH A PRESSURE RELIEF LOW-SPEED ROTATION STRUCTURE

CROSS-REFERENCE TO RELATED APPLICATIONS

This application is a continuation application of PCT International Patent Application No. PCT/CN2020/134989, filed on Dec. 9, 2020, which claims priority to and benefits of Chinese Patent Application No. 202010900752.9 filed with China National Intellectual Property Administration on Aug. 31, 2020 and entitled "Scroll Compressor", and claims priority to Chinese Patent Application No. 202021863999.X filed with China National Intellectual Property Administration on Aug. 31, 2020 and entitled "Scroll Compressor", and the entire contents of each of which are herein incorporated by reference for all purposes. No new matter has been introduced.

FIELD

The present disclosure relates to the technical field of compressors, and particularly relates to a scroll compressor.

BACKGROUND

In the related art, through disposing a check valve on the stationary scroll plate of a scroll compressor, a discharged refrigerant is prevented from flowing back, and the scroll plate is prevented from generating abrasion and abnormal sounds due to its high speed rotation.

However, when the compressor is shut down, as the check valve completely isolates the intermediate pressure chamber and the discharge space of the scroll compressor, a relatively large starting torque is then required when the compressor is started again, and then this makes the starting of the scroll compressor difficult and further affects the normal operation of the compressor.

SUMMARY

The present disclosure aims to solve at least one of the technical problems that exist in the prior art.

To this end, some embodiments of the present disclosure propose a scroll compressor.

In view of this, according to some embodiments of the present disclosure, the present disclosure proposes a scroll compressor, including: a housing; a partition plate, which is provided in the interior of the housing and which divides the interior of the housing into a suction space and a discharge space, and which is provided with a first through hole to communicate the suction space with the discharge space; a rack, which is located in the suction space in the interior of the housing, the rack and the partition plate being spaced apart; a movable scroll plate, which is movably provided on the rack; a stationary scroll plate, which is provided on the rack and which cooperates with the movable scroll plate, and which is provided with a second through hole, and the second through hole communicating with the discharge space; and a pressure relief low-speed rotation structure, which is provided on the stationary scroll plate, and is configured to be capable of communicating the second through hole with the discharge space.

With regard to the scroll compressor proposed by the present disclosure, the partition plate divides the housing into a suction space and a discharge space, and the partition plate is provided with a first through hole to communicate the suction space with the discharge space; in addition, under the compressing operation of the movable scroll plate and the stationary scroll plate, the refrigerant in the suction space is compressed and discharged into the discharge space.

Furthermore, the stationary scroll plate is further provided with a pressure relief low-speed rotation structure, and the pressure relief low-speed rotation structure can communicate the second through hole with the discharge space. That is, when the scroll compressor is shut down, after the second through hole discharges the refrigerant to the discharge space, as the refrigerant in the discharge space is a compressed refrigerant, the pressure in the discharge space is generally greater than that between the movable scroll plate and the stationary scroll plate, and then the remaining refrigerant of the pressure in the discharge space can return to the place between the movable scroll plate and the stationary scroll plate through the second through hole under the action of the pressure; or, even if the pressure of the discharge space is less than that between the movable scroll plate and the stationary scroll plate, the remaining refrigerant of the pressure between the movable scroll plate and the stationary scroll plate can also enter the discharge space through the second through hole under the action of the pressure, and then the movable scroll plate rotates at a low speed, and then the movable scroll plate is prevented from generating abrasion and abnormal sounds due to its high speed rotation, and then the pressure difference between the movable scroll plate and the stationary scroll plate and the discharge space is balanced, i.e., the pressure difference between the discharge space and the suction space is balanced, and then when the scroll compressor is started at this moment, the resistance to the discharging of the refrigerant is reduced, and the start-up performance of the scroll compressor is improved.

In addition, the scroll compressor proposed by present disclosure may further comprise the following additional technical features.

In an exemplary embodiment, furthermore, the pressure relief low-speed rotation structure comprises: a first slideway, provided in the stationary scroll plate and located between the stationary scroll plate and the partition plate; a pressure relief low-speed rotation plate, which is slidably arranged in the first slideway and can abut on the stationary scroll plate, and the passing area between the discharge space and the second through hole can be reduced when the pressure relief low-speed rotation plate abuts on the stationary scroll plate.

In this embodiment, the pressure relief low-speed rotation structure comprises the first slideway and the pressure relief low-speed rotation plate. The pressure relief low-speed rotation plate can slide in the first slideway and can abut on the stationary scroll plate, and when the pressure relief low-speed rotation plate abuts on the stationary scroll plate, the passing area between the discharge space and the second through hole is reduced, and then the refrigerant volume discharged from the discharge space to the second through hole is restrained, and then the low-speed rotation effect of the movable scroll plate is ensured, abnormal sounds and abrasion are reduced, and the checking effect of the pressure relief low-speed rotation structure is ensured when the compressor operates normally, and the normal operation of the compressor is ensured.

In some embodiments, when the movable scroll plate and the stationary scroll plate discharge the refrigerant, as the pressure of the compressed refrigerant between the movable scroll plate and the stationary scroll plate is higher than that in the discharge space, the pressure relief low-speed rotation plate bears force and does not abut on the stationary scroll plate. At this moment, a relatively large passing area is kept between the discharge space and the second through hole, and this further helps the discharge of the compressed refrigerant.

After the movable scroll plate and the stationary scroll plate discharge the refrigerant, as the pressure between the movable scroll plate and the stationary scroll plate is reduced, the pressure in the discharge space will be higher than that between the movable scroll plate and the stationary scroll plate, and then the pressure relief low-speed rotation plate will abut on the stationary scroll plate. At this moment, a relatively small passing area is kept between the discharge space and the second through hole, a small part of the refrigerant in the discharge space will flow back to the place between the movable scroll plate and the stationary scroll plate, and this further ensures the suction volume of the refrigerant between the movable scroll plate and the stationary scroll plate to ensure the normal operation of the scroll compressor.

In addition, only when the scroll compressor is shut down, as the movable scroll plate and the stationary scroll plate do not suck air for a long time, most of the refrigerant in the discharge space will flow into the suction space to balance the pressure difference, and then the compressor is subjected to less resistance when it is started again; in addition, when the compressor operates, the refrigerant in the discharge space will not flow back massively, and this ensures the checking effect of the pressure relief low-speed rotation structure, and improves the start-up performance of the scroll compressor.

In an exemplary embodiment, furthermore, the pressure relief low-speed rotation plate is provided with third through holes and fourth through holes; in the case that the pressure relief low-speed rotation plate abuts on the stationary scroll plate, the stationary scroll plate blocks the third through holes, and the fourth through holes communicate the second through hole with the discharge space.

In this embodiment, the pressure relief low-speed rotation plate is provided with the third through holes and the fourth through holes; in the case that the pressure relief low-speed rotation plate abuts on the stationary scroll plate, the stationary scroll plate blocks the third through holes, and then the control over the change of the passing area is achieved, and the structure is simple and the effect is stable.

In an exemplary embodiment, furthermore, the number of the third through holes and/or the fourth through holes can be multiple, and the multiple third through holes are arranged at the peripheral side of the fourth through holes.

In this embodiment, the third through holes are arranged at the peripheral side of the fourth through holes, and when the second through hole, as the discharge channel of the refrigerant, abuts on the pressure relief low-speed rotation plate, the portion of the stationary scroll plate at the peripheral side of the second through hole will block the third through holes, and thus this achieves reducing the passing area between the second through hole and the discharge space.

In addition, disposing the third through holes can ensure sufficient passing area when the second through hole discharges the refrigerant to the discharge space so as to help discharge the refrigerant, and thus there is considerably small passing area when the refrigerant in the discharge space flows back to lower the influence on sucking the refrigerant by the movable scroll plate and the stationary scroll plate, and ensure the normal operation of the scroll compressor.

In an exemplary embodiment, furthermore, a first limiting part is provided at an end of the first slideway that faces away from the stationary scroll plate, the first limiting part can abut on the pressure relief low-speed rotation plate, and in the case that the first limiting part abuts on the pressure relief low-speed rotation plate, the third through holes and the fourth through holes communicate the second through hole with the discharge space.

In this embodiment, the first limiting part is provided at an end of the first slideway that faces away from the stationary scroll plate, and then the pressure relief low-speed rotation plate is limited when the movable scroll plate and the stationary scroll plate discharge the refrigerant. In addition, when the first limiting part abuts on the pressure relief low-speed rotation plate, the third through holes and the fourth through holes communicate the second through hole with the discharge space at the same time, and thus, a relatively large passing area is ensured between the second through hole and the discharge space when the movable scroll plate and the stationary scroll plate discharge the refrigerant.

In an exemplary embodiment, furthermore, it further comprises: a back pressure plate, provided on the stationary scroll plate, and the first slideway is disposed in the back pressure plate; a floating plate, movably connected with the back pressure plate, and the stationary scroll plate, the back pressure plate and the floating plate form a cavity, the stationary scroll plate is provided with a fifth through hole, and the opening of the fifth through hole is positioned in the cavity.

In this embodiment, the scroll compressor is further provided with the back pressure plate and the floating plate; the stationary scroll plate, the back pressure plate and the floating plate form the cavity, and the cavity is in communication with the intermediate pressure chamber between the movable scroll plate and the stationary scroll plate through the fifth through hole.

When the movable scroll plate and the stationary scroll plate compress the refrigerant, the refrigerant will apply a pressure to the cavity to make the floating plate act; while the floating plate is restrained by the partition plate, and then the stationary scroll plate is forced to press on the movable scroll plate, and then the tightness between the movable scroll plate and the stationary scroll plate is enhanced, the effect of compressing the refrigerant by the movable scroll plate and the stationary scroll plate is improved, and the efficiency of the scroll compressor is enhanced.

In an exemplary embodiment, furthermore, it further comprises: a discharge pipe, connected with the housing, and the discharge pipe is in communication with the discharge space; and a check device, arranged in the discharge pipe.

In this embodiment, the scroll compressor further comprises the discharge pipe, the discharge pipe is in communication with the discharge space, and then the refrigerant in the discharge space is discharged by the discharge pipe after the movable scroll plate and the stationary scroll plate discharge the refrigerant to the discharge space. In addition, the discharge pipe is provided with the check device, and after the refrigerant in the discharge space is discharged out through the discharge pipe, the backflow of the refrigerant is prevented; and then when the scroll compressor is shut down, the discharge space is not in communication with downstream equipment, and this further ensures a fixed refrigerant volume in the discharge space, and then the balancing effect of the pressure difference between the discharge space and the movable scroll plate and the stationary scroll plate is improved.

In an exemplary embodiment, furthermore, the check device comprises: a second slideway, disposed in the discharge pipe; a first check plate, fixed at an end of the second slideway; a second limiting part, disposed at the other end of the second slideway; a second check plate, slidably disposed in the second slideway, and the first check plate and the second check plate are configured to be able to open or block the discharge pipe.

In this embodiment, the check device comprises the second slideway, the first check plate and the second check plate. The first check plate is fixed at an end of the second slideway, the other end of the second slideway is provided with the second limiting part, and the second check plate can move between the first check plate and the second check plate.

In some embodiments, when the discharge space discharges the refrigerant to the discharge pipe, the second check plate bears force and abuts on the second limiting part; and at this moment, the discharge space is in communication with the discharge pipe, to help the discharge space discharge the refrigerant to the discharge pipe. When the discharge space accomplishes discharging the refrigerant or the scroll compressor is shut down, the second check plate bears a force outside the discharge pipe and can abut on the first check plate, and then, the discharge space and the discharge pipe are blocked therebetween, to prevent the backflow of the refrigerant from the downstream equipment, and the relative independence of the discharge space is maintained to help balance the pressure difference between the discharge space and the movable scroll plate and the stationary scroll plate, i.e., to help balance the pressure difference between the discharge space and the suction space.

In an exemplary embodiment, furthermore, the first check plate is provided with a sixth through hole therein, the second check plate is provided with a seventh through hole therein; when the first check plate and the second check plate block the discharge pipe, the first check plate blocks the seventh through hole, and the second check plate blocks the sixth through hole.

In this embodiment, the first check plate is provided with the sixth through hole therein, the second check plate is provided with the seventh through hole therein; when the second check plate bears force and abuts on the first check plate, the first check plate blocks the seventh through hole in the second check plate, the second check plate blocks the sixth through hole, and then the blocking between the discharge space and the discharge pipe is achieved, and the structure is simple, and the reliability is fine.

In an exemplary embodiment, furthermore, the discharge pipe comprises: a first pipe, disposed in the housing, and the first check plate is fixed in the first pipe; a second pipe, and a portion of the second pipe is disposed inside the first pipe, the second limiting part is disposed in the second pipe, and the second check plate is disposed between the first check plate and the second pipe.

In this embodiment, the discharge pipe forms a sleeve structure, the first pipe is sleeved on the outer side of a portion of the second pipe, and this further helps the installation and maintenance of the check device.

The additional aspects and advantages of the present disclosure will become apparent in the following description, or will be understood by the practice of the present disclosure.

BRIEF DESCRIPTION OF THE DRAWINGS

The above and/or additional aspects and advantages of the present disclosure will be obvious and understood easily from the following description of the embodiments in combination with the accompanying drawings.

The corresponding relationships between the reference signs and the component names in FIG. 1 to FIG. 7 are as follows:

100: scroll compressor, 110: housing, 120: partition plate, 122: first through hole, 130: rack, 132: first rack, 134: second rack, 142: movable scroll plate, 144: stationary scroll plate, 1442: second through hole, 1444: fifth through hole, 150: pressure relief low-speed rotation structure, 152: first slideway, 154: pressure relief low-speed rotation plate, 1542: third through hole, 1544: fourth through hole, 156: first limiting part, 160: back pressure plate, 170: floating plate, 180: discharge pipe, 182: first pipe, 184: second pipe, 190: check device, 192: second slideway, 194: first check plate, 1942: sixth through hole, 196: second limiting part, 198: second check plate, 1982: seventh through hole, 210: suction space, 220: discharge space; 230: motor structure, 232: rotating shaft, 240: suction pipe, 250: suction chamber, 260: intermediate pressure chamber, 270: discharge chamber, and 280: cavity.

DETAILED DESCRIPTION OF THE DISCLOSURE

In order to understand the above-mentioned objectives, features and advantages of the present disclosure more clearly, a further detailed description of the present disclosure will be given below in combination with the accompanying drawings and exemplary embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the exemplary embodiments disclosed below.

A scroll compressor 100 according to some embodiments of the present disclosure are described below with reference to FIG. 1 to FIG. 7.

Figure 1:
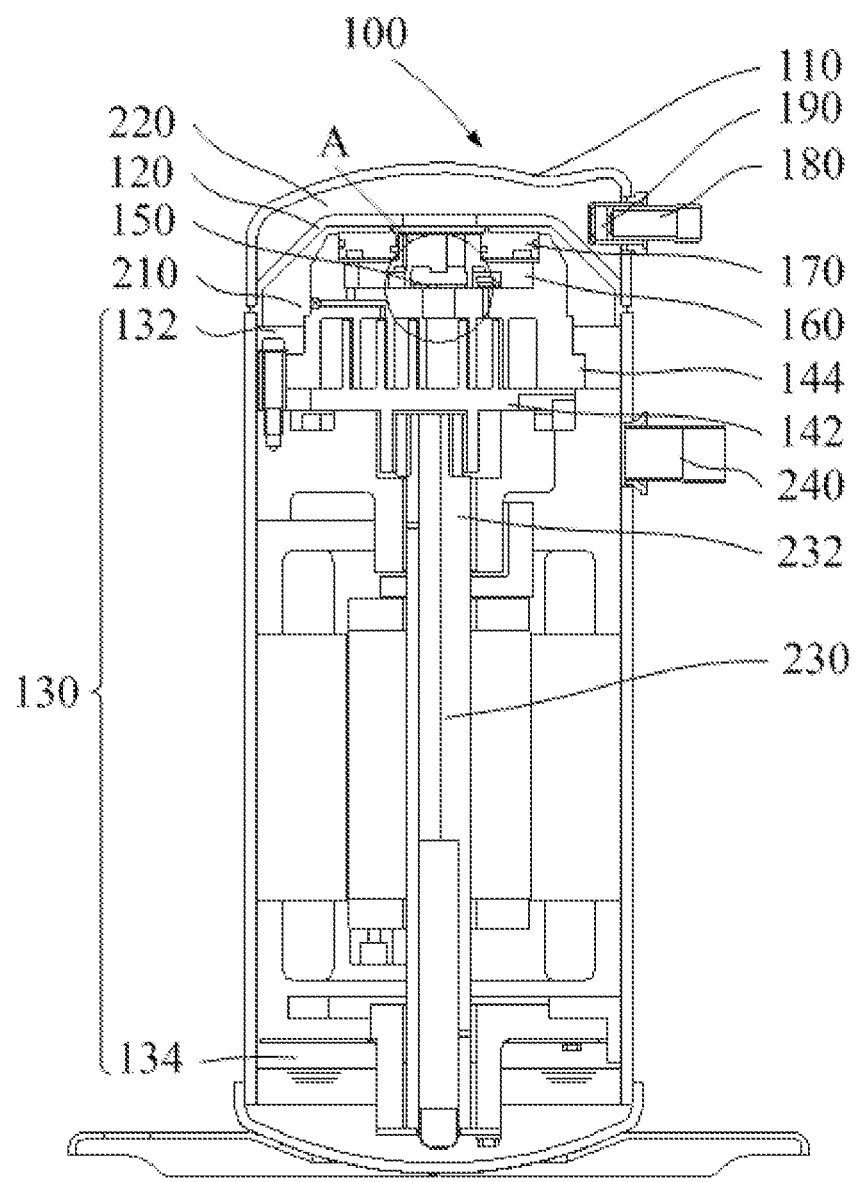
FIG. 1 is a schematic structural diagram of a scroll compressor according to an embodiment of the present disclosure.

As shown in FIG. 1, according to some embodiments of the present disclosure, an embodiment of the present disclosure proposes a scroll compressor 100, and the scroll compressor 100 comprises a housing 110, a partition plate 120, a rack 130, a movable scroll plate 142 and a stationary scroll plate 144.

The housing 110 defines the interior space of the scroll compressor 100; a partition plate 120 is provided in the interior of the housing 110; the partition plate 120 is used to divide the interior space of the scroll compressor 100 into a suction space 210 and a discharge space 220. The suction space 210 is used to accommodate uncompressed refrigerant, and the discharge space 220 is used to accommodate compressed refrigerant.

The movable scroll plate 142 and the stationary scroll plate 144 are cooperatively arranged in the suction space 210. The movable scroll plate 142 and the stationary scroll plate 144 can cooperate with each other and form a suction chamber 250, an intermediate pressure chamber 260 and a discharge chamber 270.

In some embodiments, the movable scroll plate 142 is in a movable state, the stationary scroll plate 144 is in a stationary state; the movable scroll plate 142 sucks the refrigerant through the suction chamber 250 when moving about the rotating shaft 232, then the refrigerant is compressed through the intermediate pressure chamber 260, finally the compressed refrigerant is discharged to the discharge chamber 270 to discharge the refrigerant, and then a compressing operation is accomplished.

In addition, the partition plate 120 is provided with a first through hole 122, to communicate the suction space 210 with the discharge space 220; the stationary scroll plate 144 is provided with a second through hole 1442, the second through hole 1442 is in communication with the discharge chamber 270, and then the refrigerant compressed by the movable scroll plate 142 and the stationary scroll plate 144 can be discharged to the first through hole 122 via the second through hole 1442 and then discharged to the discharge space through the first through hole 122, and thus the discharging of the refrigerant is accomplished.

With regard to the scroll compressor 100 proposed by the present disclosure, a pressure relief low-speed rotation structure 150 is further arranged between the second through hole 1442 of the stationary scroll plate 144 and the first through hole 122 of the partition plate 120, and the pressure relief low-speed rotation structure 150 always communicates the second through hole 1442 with the discharge space 220. When the scroll compressor 100 is shut down, as the movable scroll plate 142 and the stationary scroll plate 144 do not move anymore, the pressure in the discharge chamber 270 will be in balance with that in the suction space 210, and then the pressure in the discharge chamber 270 is lowered, and therefore, the pressure in the discharge space 220 will be higher than that between the movable scroll plate 142 and the stationary scroll plate 144, and then the refrigerant in the discharge space 220 will flow back to the place between the movable scroll plate 142 and the stationary scroll plate 144 through the pressure relief low-speed rotation structure 150, and in some embodiments the refrigerant flows to the discharge chamber 270 and then flows back to the suction space 210 via the discharge chamber 270, and then the movable scroll plate 142 rotates at a low speed, and then the movable scroll plate 142 is prevented from generating abrasion and abnormal sounds due to its high speed rotation, and the pressure difference between the discharge space 220 and the movable scroll plate 142 and the stationary scroll plate 144 is balanced, in some embodiments, the pressure difference between the discharge space 220 and the suction space 210. Therefore, when the movable scroll plate 142 and the stationary scroll plate 144 execute the compressing operation next time, the resistance to the discharging of the refrigerant will be reduced, and then the refrigerant can enter the discharge space 220 more easily, i.e., this helps discharge the refrigerant better, and thus the start-up performance of the scroll compressor is improved.

Figure 2:
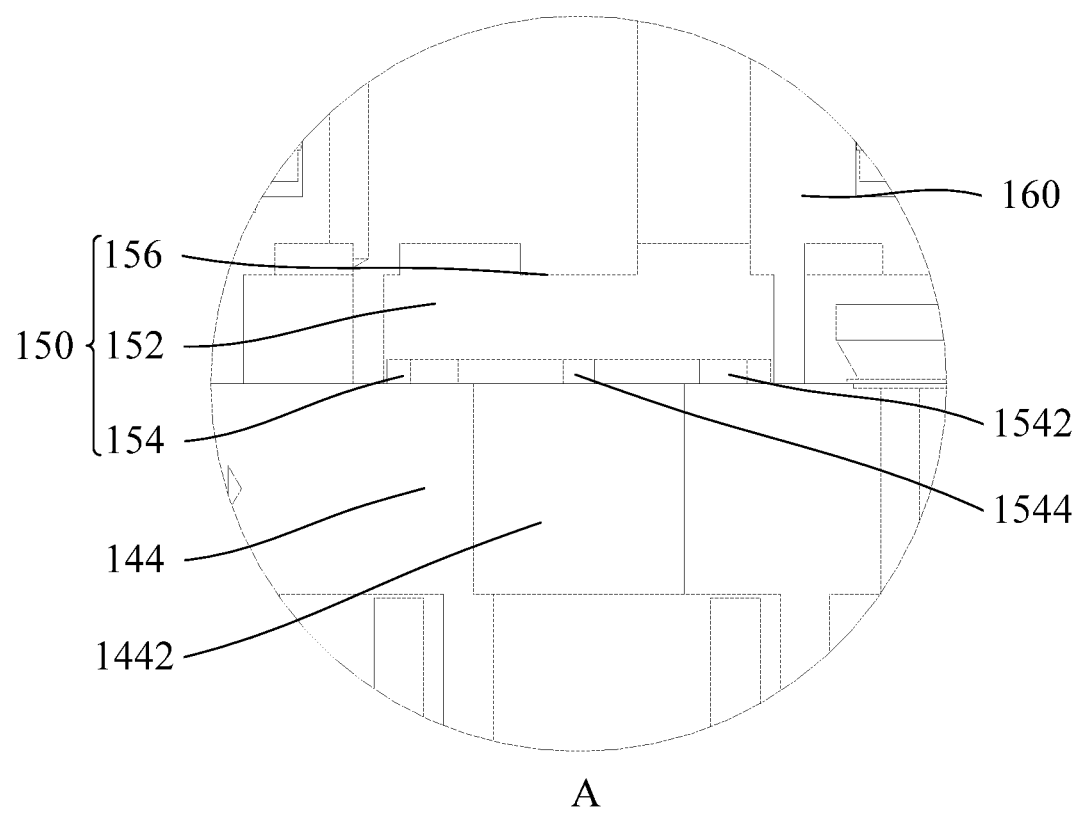
FIG. 2 is a partial enlarged diagram of position A of the scroll compressor as shown in FIG. 1.
Figure 3:
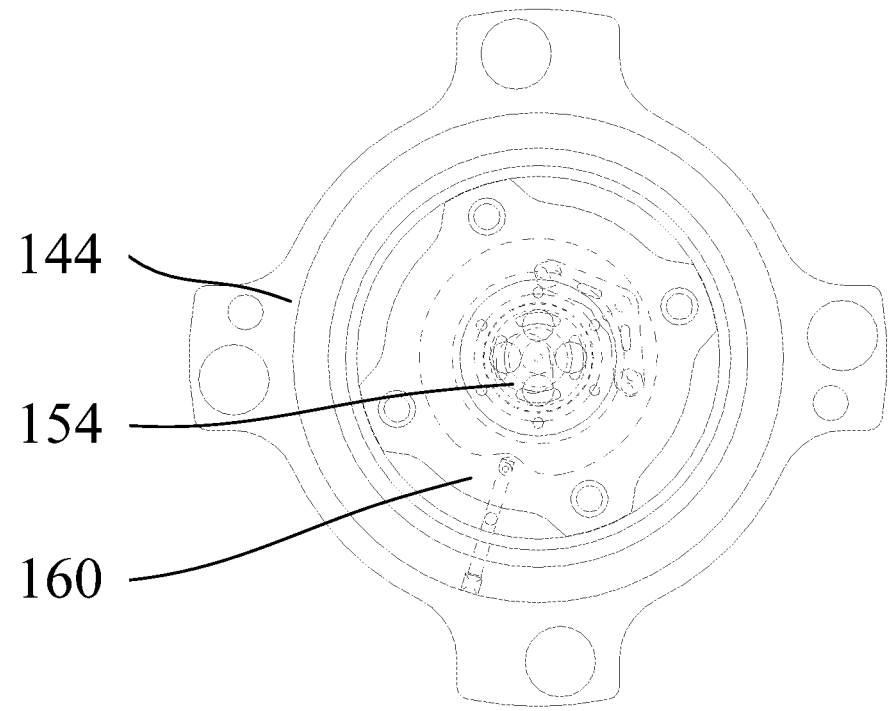
FIG. 3 is a schematic structural diagram of a stationary scroll plate, a back pressure plate and a pressure relief low-speed rotation structure in a scroll compressor according to an embodiment of the present disclosure.
Figure 4:
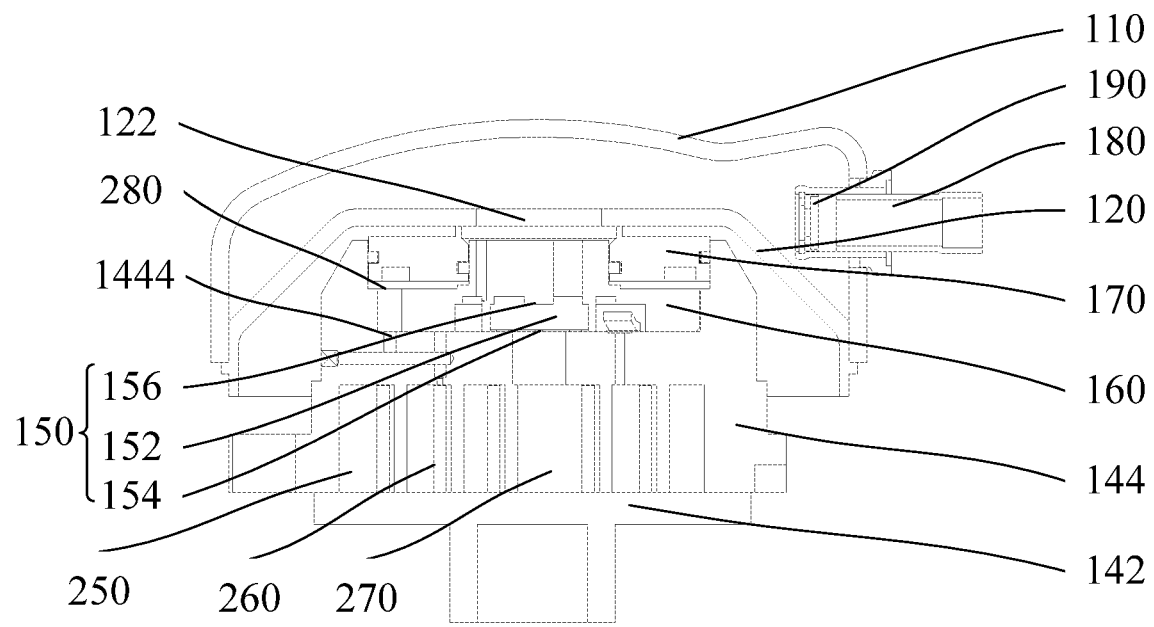
FIG. 4 is a schematic structural diagram of a portion of the members in a scroll compressor according to an embodiment of the present disclosure.

As shown in FIG. 2 to FIG. 4, on the basis of the last embodiment, the pressure relief low-speed rotation structure 150 comprises a first slideway 152 and a pressure relief low-speed rotation plate 154 that can slide in the first slideway 152.

In some embodiments, when the movable scroll plate 142 and the stationary scroll plate 144 discharge the refrigerant, the pressure relief low-speed rotation plate 154 is pushed by the refrigerant and then is away from the stationary scroll plate 144. Then, a relatively large passing area is kept between the second through hole 1442 and third through holes 1542, and then the refrigerant can enter the discharge space 220 quickly in a large amount from the second through hole 1442 via the third through holes 1542.

After the movable scroll plate 142 and the stationary scroll plate 144 discharge the refrigerant, as the pressure in the discharge space 220 is greater than that between the movable scroll plate 142 and the stationary scroll plate 144, and in some embodiments, the pressure in the discharge space 220 is greater than that in the discharge chamber 270. Then, the pressure relief low-speed rotation plate 154 bears force and abuts on the stationary scroll plate 144, and then the passing area between the second through hole 1442 and the second through hole 1442 is reduced, i.e., the volume of the refrigerant that can pass through the discharge space 220 and the second through hole 1442 is reduced, and this further ensures a low-speed rotation effect of the movable scroll plate 142, lowers the abnormal sounds and abrasion, and prevents a large amount of refrigerant backflow in the discharge space 220 from affecting the effect of sucking the refrigerant by the movable scroll plate 142 and the stationary scroll plate 144 and then prevents generating abnormal sounds and abrasion caused by the high-speed rotation of the movable scroll plate 142, and further ensures the normal operation of the scroll compressor 100.

Therefore, in this exemplary embodiment, the resistance to the movable scroll plate 142 and the stationary scroll plate 144 when they discharge the refrigerant is reduced when the scroll compressor 100 is started, and then this enables the movable scroll plate 142 and the stationary scroll plate 144 to suck the refrigerant smoothly when the scroll compressor 100 is operating, and then the normal operation of the scroll compressor 100 is ensured, and the abnormal sounds and abrasion caused by the high-speed rotation of the movable scroll plate 142 is prevented.

In some embodiments, the shape of the pressure relief low-speed rotation plate 154 can be disposed arbitrarily according to actual situations, in some embodiments, a circular shape, an elliptic shape, a polygon shape and so on.

In addition, the abnormal sounds and abrasion caused by the fast reverse rotation of the movable scroll plate 142 and the stationary scroll plate 144 can be prevented.

Figure 5:
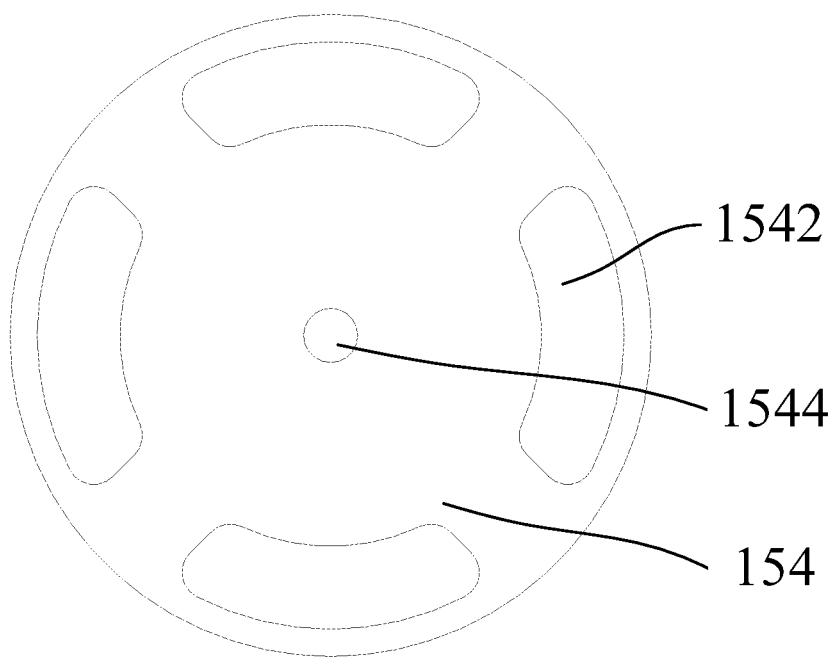
FIG. 5 is a schematic structural diagram of the pressure relief low-speed rotation structure in a scroll compressor according to an embodiment of the present disclosure.

As shown in FIG. 5, on the basis of any one of the previous embodiments, the pressure relief low-speed rotation plate 154 is provided with a plurality of channels. When the pressure relief low-speed rotation plate 154 abuts on the stationary scroll plate 144, a portion of the channels can be blocked.

In some embodiments, holes are opened in the pressure relief low-speed rotation plate 154, and the holes comprise third through holes 1542 and fourth through holes 1544; when the pressure relief low-speed rotation plate 154 abuts on the stationary scroll plate 144, the stationary scroll plate 144 can block the third through holes 1542, and only the fourth through holes communicate the second through hole 1442 with the third through holes 1542.

Furthermore, the area of the cross section of the pressure relief low-speed rotation plate 154 is larger than that of the cross section of the second through hole 1442. That is, the pressure relief low-speed rotation plate 154 can be erected at the edge of the second through holes 1442, while the third through holes 1542 are arranged at the positions which are shielded by the edge of the second through hole 1442.

Therefore, when the movable scroll plate 142 and the stationary scroll plate 144 discharge the refrigerant, the pressure relief low-speed rotation plate 154 bears the pressure inside the movable scroll plate 142 and the stationary scroll plate 144 and is pushed away from the stationary scroll plate 144. At this moment, both the third through holes 1542 and the fourth through holes 1544 are used as the flowing channels of the refrigerant, and then a relatively large passing area is provided for the refrigerant, and this further helps the movable scroll plate 142 and the stationary scroll plate 144 discharge the refrigerant rapidly.

In addition, after the movable scroll plate 142 and the stationary scroll plate 144 discharge the refrigerant, the pressure relief low-speed rotation plate 154 bears the pressure from the discharge space 220 and is pushed to and abuts on the stationary scroll plate 144. At this moment, the third through holes 1542 are blocked by the portion of the stationary scroll plate 144 located on the edge of the second through hole 1442, only the fourth through holes 1544 are used as the flowing channels of the refrigerant, and then one or multiple relatively small passing areas are provided for the backflow of the refrigerant, and then this prevents a large amount of refrigerant from flowing back to the place between the movable scroll plate 142 and the stationary scroll plate 144 from the discharge space 220, further ensures the amount of the refrigerant sucked by the movable scroll plate 142 and the stationary scroll plate 144, prevents generating the abnormal sounds and abrasion caused by the high-speed rotation of the movable scroll plate 142, and then ensures the normal operation of the scroll compressor 100 while the start-up performance of the scroll compressor 100 is improved.

In this exemplary embodiment, a plurality of channels are used when the refrigerant flows back and part of the passing is blocked to reduce the passing area of the refrigerant, and this is simple, effective and reliable.

As shown in FIG. 5, on the basis the last embodiment, the fourth through holes 1544 in the pressure relief low-speed rotation plate 154 can be arranged at the central position of the pressure relief low-speed rotation plate 154, and the third through holes 1542 are arranged at the peripheral side of the fourth through hole 1544. The number of the third through holes 1542 and the fourth through holes 1544 can be one or multiple.

Disposing the third through holes 1542 at the peripheral side of the fourth through holes 1544 facilitates the stationary scroll plate 144 to block the third through holes 1542.

In some embodiments, the specific number of the third through holes 1542 can be arranged according to the discharge capacity of the scroll compressor 100, in some embodiments, two, three, four, five, six and so on.

The shape of the third through holes 1542 can also be arranged arbitrarily according to the actual situations, in some embodiments: a circular shape, an elliptic shape, a square shape, a polygon shape, a kidney ellipsoid shape and so on.

The specific number of the fourth through holes 1544 can also be arranged arbitrarily according to the actual situations, in some embodiments, one, two, three and so on.

The shape of the fourth through holes 1544 can also be arranged arbitrarily according to the actual situations, in some embodiments: a circular shape, an elliptic shape, a square shape, a polygon shape, a kidney ellipsoid shape and so on.

In some embodiments, it can be that a plurality of third through holes 1542 are arranged around one fourth through hole 1544, or a plurality of third through holes 1542 are arranged around a plurality of the fourth through holes 1544, or one third through hole 1542 is arranged at the peripheral side of a plurality of fourth through holes 1544, or one third through hole 1542 is arranged at the peripheral side of one fourth through hole 1544.

A circular pressure relief low-speed rotation plate 154 is taken as an embodiment for description, the fourth through holes 1544 and the pressure relief low-speed rotation plate 154 are concentrically arranged, and four third through holes 1542 are arranged at the peripheral side of the fourth through holes. The outline of the third through holes 1542 is a multi-segment curve shape, in some embodiments, there can be four segments of curves, the first segment of curve and the third segment of curve are opposite to each, and the second segment of curve and the fourth segment of curve are opposite to each. The first segment of curve faces the fourth through hole 1544, then the first segment of curve and the third segment of curve are arranged concentrically with the periphery of the pressure relief low-speed rotation plate 154, the second segment of curve and the fourth segment of curve are arcs of the diameter of the radius difference between the first segment of curve and the third segment of curve, and the concave faces of the second segment of curve and the fourth segment of curve are opposite to each other. Therefore, the area of the third through holes 1542 is increased, the passing area when the movable scroll plate 142 and the stationary scroll plate 144 discharge the refrigerant is improved, and the passing area of the refrigerant flowing back to the place between the movable scroll plate 142 and the stationary scroll plate 144 from the discharge space 220 is reduced, and then the normal operation of the scroll compressor 100 is ensured while the start-up performance of the scroll compressor 100 is improved and the abnormal sounds and abrasion caused by the high-speed rotation of the movable scroll plate 142 are prevented.

As shown in FIG. 2 and FIG. 4, on the basis of any one of the last two embodiments, the pressure relief low-speed rotation plate 154 further comprises a first limiting part 156, and the first limiting part 156 is arranged on the first slideway 152 and located at an end of the first slideway 152 that faces away from the stationary scroll plate 144.

Furthermore, when the movable scroll plate 142 and the stationary scroll plate 144 discharge the refrigerant to the discharge space 220, the pressure relief low-speed rotation plate 154 abuts on the first limiting part 156. This configuration thus limits a travel for the pressure relief low-speed rotation plate 154, and further ensures that the pressure relief low-speed rotation plate 154 can act correspondingly and rapidly, reduces the occurrence of the time delay of the pressure relief low-speed rotation plate 154 in the case of state switching, improves the checking effect of the pressure relief low-speed rotation plate 154, and ensures the normal operation of the scroll compressor 100.

In some embodiments, the first limiting part 156 abuts on the peripheral side of the third through holes 1542 in the pressure relief low-speed rotation plate 154, and this further ensures that the first limiting part 156 will not block the third through holes 1542, and further ensures the passing area of the pressure relief low-speed rotation plate 154 when the movable scroll plate 142 and the stationary scroll plate 144 discharge the refrigerant.

As shown in FIG. 1, FIG. 3 and FIG. 4, on the basis of any one of the previous embodiments, the scroll compressor 100 further comprises a back pressure plate 160 and a floating plate 170 that is provided on the back pressure plate 160. The stationary scroll plate 144, the back pressure plate 160 and the floating plate 170 form a cavity 280, and the cavity 280 is in communication with the intermediate pressure chamber 260 through the fifth through hole 1444 provided in the stationary scroll plate 144.

When the movable scroll plate 142 and the stationary scroll plate 144 conduct a compressing operation, the refrigerant in the intermediate pressure chamber 260 bears pressure and is introduced to the cavity 280 through the fifth through hole 1444, and thus urges the floating plate 170 to float up.

On the above basis, the partition plate 120 restrains the moving of the floating plate 170, and thus, the pressure in the cavity 280 will act on the stationary scroll plate 144 and then press the stationary scroll plate 144 towards the movable scroll plate 142, and then the tight connection between the movable scroll plate 142 and the stationary scroll plate 144 is ensured, i.e., the independence of the suction chamber 250, the intermediate pressure chamber 260 and the discharge chamber 270 is ensured, and further the compressing effect and the compressing efficiency of the scroll compressor 100 are improved.

In some embodiments, the first slideway 152 is provided in the back pressure plate 160 and located in the intermediate channel of the back pressure plate 160.

As shown in FIG. 1 and FIG. 4, on the basis of the last embodiment, a groove is arranged at an end of the stationary scroll plate 144 that faces away from the movable scroll plate 142, and the back pressure plate 160 is provided in the groove; in addition, there is a gap between the back pressure plate 160 and the sidewall of the groove and the floating plate 170 is arranged to cover the gap.

In this exemplary embodiment, the groove is arranged at an end of the stationary scroll plate 144 that faces away from the movable scroll plate 142; the inner sidewall of the groove is a first wall, and the back pressure plate 160 is arranged in the groove; the outer sidewall of the back pressure plate 160 is a second wall, the first wall and the second wall are opposite to each other and have a gap therebetween, the two sides of the floating plate 170 are respectively movably connected with the first wall and the second wall, and then the stationary scroll plate 144, the back pressure plate 160 and the floating plate 170 enclose and form the cavity 280.

Therefore, as the back pressure plate 160 is provided in the groove of the stationary scroll plate 144, the outer wall of the entire stationary scroll plate 144 is integrally formed, and this further increases the tightness between the discharge chamber 270 and the suction chamber 250, and further improves the compressing efficiency.

Furthermore, a first sealing member is provided between the floating plate 170 and the stationary scroll plate 144, and a second sealing member is provided between the floating plate 170 and the back pressure plate 160.

Through disposing the first sealing member between the floating plate 170 and the stationary scroll plate 144 and disposing the second sealing member between the floating plate 170 and the back pressure plate 160, the impermeability is ensured at the connection position between the floating plate 170 and the stationary scroll plate 144 and at the connection position between the floating plate 170 and the back pressure plate 160, leakage from the intermediate pressure chamber 260 between the movable scroll plate 142 and the stationary scroll plate 144 is prevented, and the compressing performance of the movable scroll plate 142 and the stationary scroll plate 144 is ensured.

In addition, the back pressure plate 160 is mounted on the stationary scroll plate 144 through screws, and a third sealing member is provided between the stationary scroll plate 144 and the back pressure plate 160.

As shown in FIG. 1, FIG. 4, FIG. 6 and FIG. 7, on the basis of any one of the previous embodiments, the scroll compressor 100 further comprises a discharge pipe 180 and a check device 190 that is provided in the discharge pipe 180.

In some embodiments, the check device 190 is provided in the discharge pipe 180, when the discharge space 220 discharges the refrigerant to downstream equipment, the check device 190 communicates and opens the discharge pipe 180, and then the refrigerant can enter the downstream equipment smoothly through the discharge pipe 180. After the discharge space 220 discharges the refrigerant, or the scroll compressor 100 is shut down, as the pressure in the discharge space 220 is reduced, the pressure in the downstream equipment will be larger than that in the discharge space 220, and then, the check device 190 blocks the discharge pipe 180, to prevent the backflow of the refrigerant of the downstream equipment.

That is, when the scroll compressor 100 is shut down, as the movable scroll plate 142 and the stationary scroll plate 144 do not conduct the compressing operation anymore, the pressure in the discharge space 220 is reduced, and then under the pressure in the downstream equipment, the check device 190 will block the discharge pipe 180, and this further ensures that the pressure in the discharge space 220 will not increase, and better helps balance the pressure in the discharge space 220 and the pressure in the suction space 210, prevents the abnormal sounds and abrasion caused by the high-speed rotation of the movable scroll plate 142, and further improves the start-up performance of the scroll compressor 100.

Figure 6:
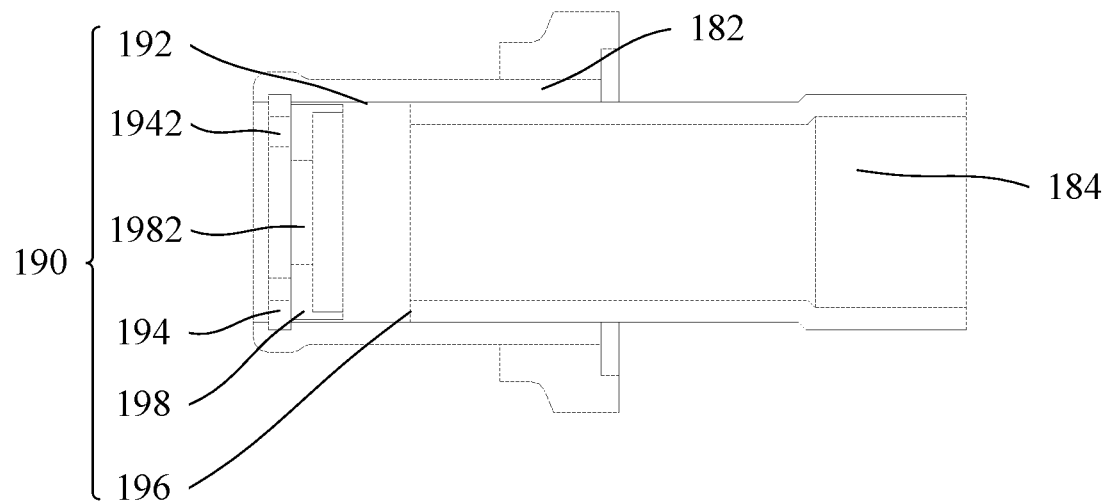
FIG. 6 is a schematic structural diagram of one state of the check device in a scroll compressor according to an embodiment of the present disclosure.
Figure 7:
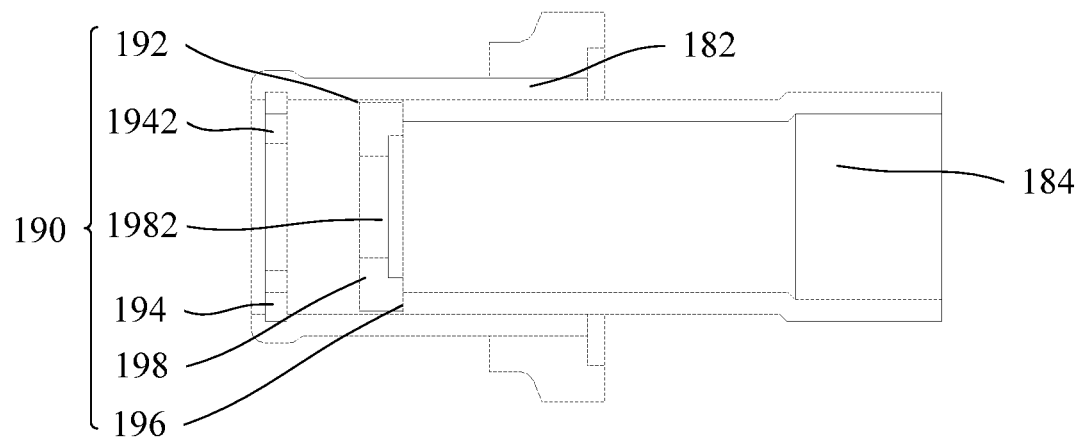
FIG. 7 is a schematic structure diagram of another state of the check device in the scroll compressor according to an embodiment of the present disclosure.

As shown in FIG. 6 and FIG. 7, on the basis of the last embodiment, the check device 190 comprises a second slideway 192, a first check plate 194, a second limiting part 196 and a second check plate 198.

In some embodiments, the second slideway 192 is provided in the discharge pipe 180, the first check plate 194 is fixed in the second slideway 192 and located at an end of the second slideway 192 that faces the discharge space 220, and the second limiting part 196 is provided at the other end of the second slideway 192.

The second check plate 198 can slide between the first check plate 194 and the second check plate 198 in the second slideway 192.

When the second check plate 198 abuts on the first check plate 194, the discharge pipe 180 is blocked. When the second check plate 198 is separated from the first check plate 194, the discharge pipe 180 is opened.

That is, as shown in FIG. 7, when the movable scroll plate 142 and the stationary scroll plate 144 discharge the refrigerant, the refrigerant enters the discharge space 220 through the pressure relief low-speed rotation structure 150 and enters the discharge pipe 180 from the discharge space 220 through the check device 190, and thus the refrigerant is discharged to the downstream equipment. In this situation, the pressure relief low-speed rotation plate 154 abuts on the first limiting part 156, the third through holes 1542 and the fourth through holes 1544 let the refrigerant pass through at the same time, the second check plate 198 abuts on the second limiting part 196, and the refrigerant can be discharged out through the discharge pipe 180 via the check device 190, and thus the discharging of the refrigerant is accomplished.

As shown in FIG. 6, after the scroll compressor 100 is shut down, or after the movable scroll plate 142 and the stationary scroll plate 144 discharge the refrigerant and the discharge space 220 discharges the refrigerant to the discharge pipe 180, the refrigerant in the downstream equipment will push the second check plate 198 to the first check plate 194, and then the second check plate 198 abuts on the first check plate 194 and thus the discharge pipe 180 is blocked, then the pressure in the discharge space 220 can only enter the second through hole 1442 through the fourth through holes 1544 in the pressure relief low-speed rotation plate 154 and enter the place between the movable scroll plate 142 and the stationary scroll plate 144, and thus the start-up performance of the scroll compressor 100 is further improved.

In some embodiments, the shape of the first check plate 194 can be arranged arbitrarily according to the actual situations, in some embodiments, a circular shape, an elliptic shape, a polygon shape and so on.

The shape of the second check plate 198 can be arranged arbitrarily according to the actual situations, in some embodiments, a circular shape, an elliptic shape, a polygon shape and so on.

As shown in FIG. 6 and FIG. 7, on the basis of the last embodiment, the first check plate 194 is opened with a sixth through hole 1942, and the second check plate 198 is opened with a seventh through hole 1982.

In some embodiments, as shown in FIG. 6, when the first check plate 194 abuts on the second check plate 198, the sixth through hole 1942 and the seventh through hole 1982 are dislocated from each other and do not intersect. Furthermore, the first check plate 194 abuts on the second check plate 198, and then the first check plate 194 and the second check plate 198 can form an enclosed structure, and this ensures that the refrigerant cannot pass through. As shown in FIG. 7, after the first check plate 194 is separated from the second check plate 198, the sixth through hole 1942 and the seventh through hole 1982 can let the refrigerant pass through.

In some embodiments, the specific number of the sixth through hole 1942 can be arranged according to the discharge capacity of the scroll compressor 100, in some embodiments, two, three, four, five, six and so on.

The shape of the seventh through hole 1982 can also be arranged according to the discharge capacity of the scroll compressor, in some embodiments: a circular shape, an elliptic shape, a square shape, a polygon shape, a kidney ellipsoid shape and so on.

The specific number of the sixth through hole 1942 can be arranged according to the discharge capacity of the scroll compressor 100, in some embodiments, one, two, three and so on.

The shape of the seventh through hole 1982 can also be arranged arbitrarily according to the actual situations, in some embodiments: a circular shape, an elliptic shape, a square shape, a polygon shape, a kidney ellipsoid shape and so on.

In some embodiments, the sixth through hole 1942 can be provided at a position of the first check plate 194 that faces away from the central position, and the seventh through hole 1982 can be provided at the central position of the second check plate 198.

A circular first check plate 194 and a circular second check plate 198 are taken as embodiments for description, a plurality of the sixth through holes 1942 are provided at the position around the outer side of the center point of the first check plate 194, and one seventh through hole 1982 is provided at the central position of the second check plate 198.

Furthermore, the outline of the sixth through holes 1942 is a multi-segment curve shape, and in some embodiments, it can be four segments of curves, the first segment of curve and the third segment of curve are opposite to each, and the second segment of curve and the fourth segment of curve are opposite to each. The first segment of curve faces the fourth through hole 1544, then the first segment of curve and the third segment of curve are arranged concentrically with the periphery of the first check plate 194, the second segment of curve and the fourth segment of curve are arcs of the diameter of the radius difference between the first segment of curve and the third segment of curve, and the concave faces of the second segment of curve and the fourth segment of curve are opposite to each other.

That is, when the movable scroll plate 142 and the stationary scroll plate 144 discharge the refrigerant, the refrigerant enters the discharge space 220 through the pressure relief low-speed rotation structure 150, and enters the discharge pipe 180 from the discharge space 220 through the check device 190, and thus the refrigerant is discharged to the downstream equipment. In this situation, the pressure relief low-speed rotation plate 154 abuts on the first limiting part 156, the third through holes 1542 and the fourth through holes 1544 let the refrigerant pass through at the same time, the second check plate 198 abuts on the second limiting part 196, and the refrigerant can be discharged out through the discharge pipe 180 via the sixth through hole 1942 in the first check plate 194 and the seventh through hole 1982 in the second check plate 198, and thus the discharging of the refrigerant is accomplished.

After the scroll compressor 100 is shut down, or after the movable scroll plate 142 and the stationary scroll plate 144 discharge the refrigerant and the discharge space 220 discharges the refrigerant to the discharge pipe 180, the refrigerant in the downstream equipment will push the second check plate 198 to the first check plate 194, and then the second check plate 198 abuts on the first check plate 194, and then the sixth through holes 1942 and the seventh through hole 1982 are blocked and then the discharge pipe 180 is further blocked, and then the pressure in the discharge space 220 can only enter the second through hole 1442 through the fourth through holes 1544 in the pressure relief low-speed rotation plate 154 and enter the place between the movable scroll plate 142 and the stationary scroll plate 144. This configuration further improves the effect of balancing the pressure between the discharge space 220 and the suction space 210, and further improves the start-up performance of the scroll compressor 100.

As shown in FIG. 6 and FIG. 7, on the basis of any one of the last three embodiments, the discharge pipe 180 comprises a first pipe 182 and a second pipe 184, and a portion of the second pipe 184 is arranged going through the first pipe.

In some embodiments, the first pipe 182 is connected with the housing 110, and the second pipe 184 is connected with the first pipe 182.

On the above basis, the end of the second pipe 184 that is located inside the first pipe 182 can be used as a second limiting part 196, and then the manufacturing difficulty is lowered.

A second slideway 192 is formed on the interior portion of the first pipe 182, the first check plate 194 is provided at a side of the first pipe 182 that is away from the second pipe 184, and the second check plate 198 is located in the first pipe 182 and can slide in the first pipe 182.

As shown in FIG. 1, on the basis of any one of the previous embodiments, the scroll compressor 100 further comprises a motor structure 230, and the motor structure 230 comprises a rotating shaft 232. The rotating shaft 232 is connected with the movable scroll plate 142 to drive the movable scroll plate 142 to move.

In addition, a rack 130 comprises a first rack 132 and a second rack 134, the movable scroll plate 142 and the stationary scroll plate 144 are provided on the first rack 132, and the motor structure 230 is provided on the second rack 134.

In this exemplary embodiment, through the rotating of the rotating shaft 232 in the motor structure 230, the movable scroll plate 142 is driven to move about the rotating shaft 232, and then the compressing operation of the scroll compressor 100 is achieved.

As shown in FIG. 1, on the basis of any one of the previous embodiments, the scroll compressor 100 further comprises a suction pipe 240, and the suction pipe 240 is in communication with the suction space 210.

In the embodiment, through connecting the suction pipe 240 with upstream equipment, sucking the refrigerant into the compressor is achieved.

As shown in FIG. 1 to FIG. 7, the present disclosure proposes a scroll compressor 100 which comprises a housing 110, a first rack 132 and a second rack 134; a motor structure 230 is disposed inside the housing 110; the movable scroll plate 142 and the stationary scroll plate 144 are disposed above the first rack; the partition plate 120 divides the interior of the housing 110 into a suction space 210 and a discharge space 220; the motor structure 230 drives the movable scroll plate 142 to rotate through the rotating shaft 232, which is in some embodiments a crankshaft; the movable scroll plate 142 constitutes the suction chamber 250, the intermediate pressure chamber 260 and the discharge chamber 270 along a set trajectory together with the stationary scroll plate 144; the stationary scroll plate 144 is opened with a second through hole 1442 that communicates the intermediate pressure chamber 260; the stationary scroll plate 144, the back pressure plate 160 and the floating plate 170 constitute the cavity 280; the refrigerant is sucked from the outer side of the stationary scroll plate 144, then compressed in the intermediate pressure chamber 260, discharged to the discharge space 220 in the scroll compressor 100 from the second through hole 1442 of the stationary scroll plate 144, and then discharged out of the scroll compressor 100 through the discharge pipe 180.

In addition, a pressure relief low-speed rotation plate 154 is provided at the discharge outlet of the stationary scroll plate 144, and this effectively prevents that the pressure difference makes the refrigerant flow back to the place between the movable scroll plate 142 and the stationary scroll plate 144 from the stationary scroll plate 144 when the scroll compressor 100 stops, and this causes the fast reverse rotation of the movable scroll plate 142 and the stationary scroll plate 144 and then renders abnormal sounds and abrasion. In addition, the pressure relief low-speed rotation plate 154 further communicates the discharge space 220 with the place between the movable scroll plate 142 and the stationary scroll plate 144, and can further balance the pressure difference between the discharge space 220 and the movable scroll plate 142 and the stationary scroll plate 144 to be able to reduce the resistance to discharge the pressure of the movable scroll plate 142 and the stationary scroll plate 144 when the scroll compressor 100 is started again, and then to improve the start-up performance of the scroll compressor 100. In addition, the pressure relief low-speed rotation plate 154 has the advantages of a simple structure and low manufacturing costs.

In the present disclosure, the terms "first", "second" and "third" are used for the purpose of description only, and cannot be understood as indicating or implying relative importance, and the term of "multiple" indicates two or more, unless otherwise explicitly specified or defined. The terms "mounting", "connected with", "connection", "fixing" and the like should be understood in a broad sense, in some embodiments, the term "connection" may be a fixed connection, and may also be a removable connection, or an integral connection; and the term "connected with" may be a direct connection and may also be an indirect connection through an intermediary. A person of ordinary skills in the art could understand the specific meanings of the terms in the present disclosure according to specific situations.

In the description of the present disclosure, it needs to be understood that the orientation or position relations indicated by the terms of "upper", "lower", "left", "right", "front", "rear" and the like are based on the orientation or position relations shown in the accompanying drawings, and they are just intended to conveniently describe the present disclosure and simplify the description, and are not intended to indicate or imply that the devices or units as indicated should have specific orientations or should be configured or operated in specific orientations, and then should not be construed as limitations to the present application.

In the description of the present specification, the descriptions of the terms "one embodiment", "some embodiments" and "specific embodiments" and the like mean that specific features, structures, materials or characteristics described in combination with the embodiment(s) or embodiment(s) are included in at least one embodiment or embodiment of the present disclosure. In the specification, the schematic representation of the above terms does not necessarily refer to the same embodiment or embodiment. Moreover, the particular features, structures, materials or characteristics described may be combined in a suitable manner in any one or more embodiments or embodiments.

The descriptions above are only preferred embodiments of the present disclosure, which are not used to limit the present disclosure. For a person skilled in the art, the present disclosure may have various changes and variations. Any modifications, equivalent substitutions, improvements and etc. made within the spirit and principle of the present disclosure shall all be included in the protection scope of the present disclosure.

What is claimed is:

1. A scroll compressor comprising:
   a housing;
   a partition plate, wherein the partition plate is provided in an interior of the housing and divides the interior of the housing into a suction space and a discharge space, wherein the partition plate is provided with a first through hole to communicate the suction space with the discharge space;
   a rack located in the suction space in the interior of the housing, the rack and the partition plate being spaced apart;
   a movable scroll plate movably provided on the rack;
   a stationary scroll plate, wherein the stationary scroll plate is provided on the rack and cooperates with the movable scroll plate, wherein the stationary scroll plate is provided with a second through hole communicating with the discharge space; and
   a pressure relief low-speed rotation structure, wherein the pressure relief low-speed rotation structure is provided on the stationary scroll plate and is configured to be capable of, in a shut down state of the scroll compressor, balance pressure in the discharge space with pressure in the suction space by allowing the second through hole to communicate with the discharge space.

2. The scroll compressor according to claim 1, wherein the pressure relief low-speed rotation structure comprises:
   a first slideway located between the stationary scroll plate and the partition plate; and
   a pressure relief low-speed rotation plate slidably arranged in the first slideway and can abut on the stationary scroll plate, wherein a passing area between the discharge space and the second through hole is reduced when the pressure relief low-speed rotation plate abuts on the stationary scroll plate.

3. The scroll compressor according to claim 2, wherein:
   the pressure relief low-speed rotation plate is provided with at least one third through hole and at least one fourth through hole; and
   in a case that the pressure relief low-speed rotation plate abuts on the stationary scroll plate, the stationary scroll plate blocks the at least one third through hole, and the at least one fourth through hole communicates the second through hole with the discharge space.

4. The scroll compressor according to claim 3, wherein:
   a number of the at least one third through hole is multiple, and
   the multiple third through holes are arranged at a peripheral side of the fourth through holes.

5. The scroll compressor according to claim 3, wherein:
   a number of the fourth through holes is multiple, and
   the multiple third through holes are arranged at a peripheral side of the fourth through holes.

6. The scroll compressor according to claim 3, wherein:
   a first limiting part is provided at an end of the first slideway that faces away from the stationary scroll plate,
   the first limiting part abuts on the pressure relief low-speed rotation plate, and
   the at least one third through hole and the at least one fourth through hole communicate the second through hole with the discharge space.

7. The scroll compressor according to claim 2, further comprising:
   a back pressure plate provided on the stationary scroll plate, wherein the first slideway is disposed in the back pressure plate; and
   a floating plate movably connected with the back pressure plate, wherein the stationary scroll plate, the back pressure plate and the floating plate form a cavity, the stationary scroll plate is provided with a fifth through hole, and an opening of the fifth through hole is positioned in the cavity.

8. The scroll compressor according to claim 1, further comprising:
   a discharge pipe connected with the housing, wherein the discharge pipe is in communication with the discharge space; and
   a check device arranged in the discharge pipe.

9. The scroll compressor according to claim 8, wherein the check device comprises:
   a second slideway disposed in the discharge pipe;
   a first check plate fixed at a first end of the second slideway;
   a second limiting part disposed at a second end of the second slideway; and
   a second check plate slidably disposed in the second slideway, wherein the first check plate and the second check plate are configured to be able to open or block the discharge pipe.

10. The scroll compressor according to claim 9, wherein:
    the first check plate is provided with a sixth through hole, and the second check plate is provided with a seventh through hole; and
    when the first check plate and the second check plate block the discharge pipe, the first check plate blocks the seventh through hole, and the second check plate blocks the sixth through hole.

11. The scroll compressor according to claim 9, wherein the discharge pipe comprises:
    a first pipe disposed in the housing, wherein the first check plate is fixed in the first pipe; and
    a second pipe,
    wherein a portion of the second pipe is disposed inside the first pipe, an end of the second pipe is the second limiting part, and the second check plate is disposed between the first check plate and the second pipe.

* * * * *